US011257463B2

(12) United States Patent
Flamand et al.

(10) Patent No.: US 11,257,463 B2
(45) Date of Patent: Feb. 22, 2022

(54) ARTIFICIAL EYE SYSTEM

(71) Applicant: CAE INC., Saint-Laurent (CA)

(72) Inventors: Jean-Sebastien Flamand, Saint-Laurent (CA); Francois Caron, Saint-Laurent (CA)

(73) Assignee: CAE INC., Saint-Laurent (CA)

( * ) Notice: Subject to any disclaimer, the term of this patent is extended or adjusted under 35 U.S.C. 154(b) by 0 days.

(21) Appl. No.: 15/475,971

(22) Filed: Mar. 31, 2017

(65) Prior Publication Data

US 2018/0286350 A1 Oct. 4, 2018

(51) Int. Cl.
*G09B 23/32* (2006.01)
*G09G 5/10* (2006.01)
*G09G 3/20* (2006.01)

(52) U.S. Cl.
CPC ............ *G09G 5/10* (2013.01); *G09B 23/32* (2013.01); *G09G 3/20* (2013.01); *G09G 3/2003* (2013.01); *G09G 2320/0626* (2013.01); *G09G 2354/00* (2013.01); *G09G 2360/144* (2013.01); *G09G 2360/148* (2013.01); *G09G 2360/16* (2013.01); *G09G 2380/08* (2013.01)

(58) Field of Classification Search
CPC ............ G09G 5/10; G09G 2320/0626; G09G 2380/08; G09G 2354/00; G09G 2360/144; G09G 2360/148; G09G 2360/16; G09G 3/20; G09G 3/2003; G09B 23/30; G09B 23/32; G09B 9/00
See application file for complete search history.

(56) References Cited

U.S. PATENT DOCUMENTS

| 3,905,130 | A | * | 9/1975 | Gordon | G09B 23/32 434/271 |
| 4,930,236 | A | * | 6/1990 | Hart | G09F 19/08 340/692 |
| 5,505,623 | A | * | 4/1996 | Chernack | G09B 23/30 434/270 |
| 5,686,981 | A | * | 11/1997 | Anan | A61B 3/0058 351/206 |

(Continued)

OTHER PUBLICATIONS

"A design of near-eye 3D display based on dual-OLED", Article in Proceedings of SPIE—The International Society for Optical Engineering, Jul. 2010, Chen et al.

(Continued)

*Primary Examiner* — Eddy Saint-Vil
(74) *Attorney, Agent, or Firm* — Fasken Martineau Dumoulin LLP; Serge Lapointe

(57) ABSTRACT

There is described a system for controlling an artificial body comprising at least one of at least one articulated body part and a sound reproduction device, the system comprising: a display unit for displaying an image of an eye thereon, the screen comprising a plurality of light cells each adapted to emit light, at least a given one of the light cells being adapted to selectively emit light and detect light; and a controller for controlling the display unit, the controller for: operating at least one first light cell each as a light detector in order to detect light incident thereon, the least one first light cell being selected among the at least a given one of the light cells; determining a reaction as a function of the detected light; and outputting a command indicative of the determined reaction.

19 Claims, 6 Drawing Sheets

(56) References Cited

U.S. PATENT DOCUMENTS

| | | | | |
|---|---|---|---|---|
| 5,691,800 | A * | 11/1997 | Iki | A61B 3/103 351/205 |
| 5,796,991 | A * | 8/1998 | Shimizu | G06T 11/00 703/1 |
| 5,900,923 | A * | 5/1999 | Prendergast | G09B 23/28 351/211 |
| 5,990,901 | A * | 11/1999 | Lawton | G06T 15/503 345/581 |
| 6,052,132 | A * | 4/2000 | Christian | G06T 13/40 345/474 |
| 6,259,838 | B1 * | 7/2001 | Singh | G09F 9/305 385/131 |
| 6,628,248 | B2 * | 9/2003 | Masumoto | G09G 3/02 345/207 |
| 6,634,751 | B2 * | 10/2003 | Turner | A61B 3/0025 351/212 |
| 6,664,744 | B2 * | 12/2003 | Dietz | G09G 3/3406 315/291 |
| 7,288,753 | B2 | 10/2007 | Cok | |
| 7,551,158 | B2 * | 6/2009 | Nishimura | G09G 3/3413 345/102 |
| 7,868,857 | B2 * | 1/2011 | Nathan | G09G 3/3241 345/690 |
| 7,961,171 | B2 * | 6/2011 | Miyasaka | G09G 3/3446 345/104 |
| 8,052,502 | B2 * | 11/2011 | Connolly | A63H 3/006 446/389 |
| 8,564,580 | B2 * | 10/2013 | Sakai | G02F 1/13318 250/205 |
| 8,764,449 | B2 * | 7/2014 | Rios | G09B 23/30 434/262 |
| 9,220,404 | B2 * | 12/2015 | Ng | A61B 3/0025 |
| 9,324,247 | B2 | 4/2016 | Eggert et al. | |
| 2005/0050205 | A1 * | 3/2005 | Gordy | G06F 13/387 709/227 |
| 2008/0150848 | A1 * | 6/2008 | Chung | G06F 3/0412 345/82 |
| 2008/0227073 | A1 | 9/2008 | Bardsley et al. | |
| 2012/0038739 | A1 | 2/2012 | Welch et al. | |
| 2014/0038153 | A1 * | 2/2014 | Courtoy | G09B 23/28 434/271 |
| 2015/0004584 | A1 * | 1/2015 | Galibois | G09B 23/30 434/270 |

OTHER PUBLICATIONS

"Towards a Human-like Robot for Medical Simulation", Thesis submitted to the faculty of the Virginia Polytechnic Institute and State University, Sep. 2, 2011, Nicholas David Thayer.

* cited by examiner

ARTIFICIAL EYE SYSTEM

TECHNICAL FIELD

The present invention relates to the field of artificial eyes, and more particularly to artificial eyes for artificial bodies such as patient simulators, mannequins or robots.

BACKGROUND

Artificial bodies such as patient simulators, mannequins, toys or robots are used for different purposes including training. For example, patient simulators are used for training physicians. In this case, patient simulators are developed so as to mimic human behaviors, simulate diseases, etc. in order to allow interaction between the patient simulators and the physician.

For example, some patient simulators are usually provided with artificial eyes in order to train physicians on eye diseases, vital signs detection, consciousness detection, etc. Some artificial eyes are mechanical eyes which may be articulated. For example, the diameter of a motorized pupil or a motorized iris of some mechanical eyes may change according to the intensity of ambient light or following the illumination of the eye by a light beam. However, at least some of the mechanical eyes do not offer flexibility since their appearance cannot be changed in addition to being noisy. Therefore, the appearance of such a mechanical eye cannot be changed to simulate different diseases or even change the color of the iris. In order to overcome this issue, displays have been used to simulate eyes. An artificial body is then provided two displays on which an image of eye is displayed. Such a technic allows modifying the appearance of the displayed eyes to simulate different diseases for example.

Some of the artificial eyes that comprise a display to display images of an eye also comprise a light sensor for modifying the appearance of the displayed eyes according to the detected light. For example, the diameter of the pupil may vary according to the light detected by the light sensor. However, the light sensor is located away from the display which may create unrealistic situations. For example, if a physician in training propagates a light beam towards the pupil of a displayed eye, the light sensor may not detect the light since it is positioned away to the display. Therefore, the appearance of the pupil will not change since no light is detected by the light sensor, which represents a non-realistic scenario.

Therefore, there is a need for an improved artificial eye system.

SUMMARY

In accordance with a first broad aspect, there is provided an artificial eye system comprising: a display unit for displaying an image of an eye thereon, the screen comprising a plurality of light cells each adapted to emit light, at least a given one of the light cells being adapted to selectively emit light and detect light; and a controller for controlling the display unit, the controller for: operating at least one first light cell each as a light detector in order to detect light incident thereon, the least one first light cell being selected among the at least a given one of the light cells; determining an image of the eye to be displayed on the display unit as a function of the detected light; and operating second light cells each as a light emitter in order to display the determined image of the eye on the display unit, the second light cells being selected among the plurality of light cells.

In one embodiment, the controller is adapted to determine the image of the eye to be displayed as a function of a patient profile, the patient profile comprising at least one of an age, an eye color, a weight, a heart rate, an ethnicity and a medical condition.

In one embodiment, the controller is further adapted to select the at least one first light cell among the at least a given one of the light cells.

In one embodiment, the selection of the at least one first light cell is constant in time.

In another embodiment, the selection of the at least one first light cell varies in time.

In one embodiment, a number of the least one first light cell varies in time.

In another embodiment, a number of the least one first light cell in constant in time.

In one embodiment, the controller is adapted to randomly select the at least one first light cell.

In another embodiment, the controller is adapted to select the at least one first light cell at least partially as a function of a given image of the eye being actually displayed on the display unit.

In one embodiment, the controller is adapted to determine the image of the eye to be displayed as a function of an intensity of the detected light.

In one embodiment, the intensity comprises one of a peak intensity, a total intensity and an average intensity.

In another embodiment, the intensity comprises a pattern of detected light indicating a measured intensity and a position within the display unit for each one of the at least one first light cell.

In one embodiment, the controller is adapted to determine the image of the eye to be displayed as a function of an intensity variation of the detected light.

In one embodiment, the intensity variation comprises one of a peak intensity variation, a total intensity variation and an average intensity variation.

In another embodiment, the intensity variation comprises a variation of a pattern of detected light indicating a measured intensity and a position within the display unit for each one of the at least one first light cell.

In one embodiment, the controller is adapted to determine at least one characteristic for at least one element to be contained in the image of the eye to be displayed as a function of the detected light.

In one embodiment, the at least one characteristic comprises at least one of a shape, a color, a size and a position for at least one element.

In one embodiment, the at least one element comprises at least a sclera and a pupil.

In one embodiment, the at least one element further comprises at least one of an iris, an upper eyelid, a lower eyelid, eyelashes, and a lacrimal caruncle.

In one embodiment, the controller is further adapted to select the second light cells among the plurality of light cells.

In one embodiment, the controller is adapted to determine at least one of an emission wavelength and an emission intensity for each one of the second light cells as a function of the image of the eye to be displayed.

In one embodiment, the system further comprises a light sensor for measuring a wavelength of the detected light, the controller being further adapted to generate the image of the eye to be displayed as a function of the measured wavelength.

In accordance with a second broad aspect, there is provided a method for displaying an eye on a display unit, the display unit comprising a plurality of light cells each adapted to emit light and detect light, at least a given one of the light cells being adapted to selectively emit light and detect light, the method comprising: operating at least one first light cell each as a light detector, thereby detecting light incident thereon, the least one first light cell being selected among the at least a given one of the light cells; determining an image of the eye to be displayed on the display unit as a function of the detected light; and operating second light cells each as a light emitter, thereby displaying the determined image of the eye on the display unit, the second light cells being selected among the plurality of light cells.

In one embodiment, the step of determining the image of the eye to be displayed is further performed as a function of a patient profile, the patient profile comprising at least one of an age, an eye color, a weight, a heart rate, an ethnicity and a medical condition.

In one embodiment, the method further comprises selecting the at least one first light cell among the at least a given one of the light cells.

In one embodiment, said selecting the at least one first light cell is constant in time.

In another embodiment, said selecting the at least one first light cell varies in time.

In one embodiment, a number of the least one first light cell varies in time.

In another embodiment, a number of the least one first light cell in constant in time.

In one embodiment, said selecting the at least one first light cell is performed randomly.

In another embodiment, said selecting the at least one first light cell is performed at least partially as a function of a given image of the eye being actually displayed on the display unit.

In one embodiment, said determining the image of the eye to be displayed is performed as a function of an intensity of the detected light.

In one embodiment, the intensity comprises one of a peak intensity, a total intensity and an average intensity.

In another embodiment, the intensity comprises a pattern of detected light indicating a measured intensity and a position within the display unit for each one of the at least one first light cell.

In one embodiment, said determining the image of the eye to be displayed is performed as a function of an intensity variation of the detected light.

In one embodiment, the intensity variation comprises one of a peak intensity variation, a total intensity variation and an average intensity variation.

In another embodiment, the intensity variation comprises a variation of a pattern of detected light indicating a measured intensity and a position within the display unit for each one of the at least one first light cell.

In one embodiment, wherein said determining the image to be displayed comprises determining at least one characteristic for at least one element to be contained in the image of the eye to be displayed as a function of the detected light.

In one embodiment, the at least one characteristic comprises at least one of a shape, a color, a size and a position for at least one element.

In one embodiment, the at least one element comprises at least a sclera and a pupil.

In one embodiment, the at least one element further comprises at least one of an iris, an upper eyelid, a lower eyelid, eyelashes, and a lacrimal caruncle.

In one embodiment, the method further comprises selecting the second light cells among the plurality of light cells.

In one embodiment, the method further comprises determining at least one of an emission wavelength and an emission intensity for each one of the second light cells as a function of the image of the eye to be displayed.

In one embodiment, the method further comprises measuring a wavelength of the detected light, said determining the image of the eye to be displayed being further performed as a function of the measured wavelength.

In accordance with a third broad aspect, there is provided an artificial eye system comprising: a display unit for displaying an image of an eye thereon, the screen comprising a plurality of light cells each adapted to emit light, at least a given one of the light cells being adapted to selectively emit light and detect light; and a light cell control unit for operating at least one first light cell each as a light detector in order to detect light incident thereon, the least one first light cell being selected among the at least a given one of the light cells, and operating second light cells each as a light emitter, the second light cells being selected among the plurality of light cells; and an image determination unit for determining an image of the eye to be displayed on the display unit as a function of the detected light, the operation of the second light cells allowing the display of the determined image of the eye on the display unit.

According to another broad aspect, there is provided a patient simulator comprising: at least a head; and the artificial eye system described above, the artificial eye system being embedded into the head.

In one embodiment, the patient simulator further comprising at least one of a torso, at least one arm, at least one hand, at least one leg, and at least one foot.

According to a further broad aspect, there is provided a system for controlling an artificial body comprising at least one of at least one articulated body part and a sound reproduction device, the system comprising: a display unit for displaying an image of an eye thereon, the screen comprising a plurality of light cells each adapted to emit light, at least a given one of the light cells being adapted to selectively emit light and detect light; and a controller for controlling the display unit, the controller for: operating at least one first light cell each as a light detector in order to detect light incident thereon, the least one first light cell being selected among the at least a given one of the light cells; determining a reaction as a function of the detected light; and outputting a command indicative of the determined reaction.

In one embodiment, the controller is adapted to determine the reaction as a function of a patient profile, the patient profile comprising at least one of an age, an eye color, a weight, a heart rate, an ethnicity and a medical condition.

In one embodiment, the controller is further adapted to select the at least one first light cell among the at least a given one of the light cells.

In one embodiment, the selection of the at least one first light cell is constant in time.

In another embodiment, the selection of the at least one first light cell varies in time.

In one embodiment, a number of the least one first light cell varies in time.

In one embodiment, a number of the least one first light cell in constant in time.

In one embodiment, the controller is adapted to randomly select the at least one first light cell.

In one embodiment, the controller is adapted to select the at least one first light cell at least partially as a function of a given image of the eye being actually displayed on the display unit.

In one embodiment, the controller is adapted to determine the reaction as a function of an intensity of the detected light.

In one embodiment, the intensity comprises one of a peak intensity, a total intensity and an average intensity.

In one embodiment, the intensity comprises a pattern of detected light indicating a measured intensity and a position within the display unit for each one of the at least one first light cell.

In one embodiment, the controller is adapted to determine the reaction as a function of an intensity variation of the detected light.

In one embodiment, the intensity variation comprises one of a peak intensity variation, a total intensity variation and an average intensity variation.

In one embodiment, the intensity variation comprises a variation of a pattern of detected light indicating a measured intensity and a position within the display unit for each one of the at least one first light cell.

In one embodiment, the determined reaction comprises a movement for the articulated body part.

In one embodiment, the controller is adapted to determine at least one of a type of movement and a movement amplitude.

In one embodiment, the reaction comprises a sound to be emitted.

According to still another broad aspect, there is provided a method for controlling an artificial body comprising at least one of at least one articulated body part and a sound reproduction device using a display unit, the display unit comprising a plurality of light cells each adapted to emit light and detect light, at least a given one of the light cells being adapted to selectively emit light and detect light, the method comprising: operating at least one first light cell each as a light detector, thereby detecting light incident thereon, the least one first light cell being selected among the at least a given one of the light cells; determining a reaction as a function of the detected light; and outputting a command indicative of the determined reaction.

In one embodiment, the step of determining the reaction is further performed as a function of a patient profile, the patient profile comprising at least one of an age, an eye color, a weight, a heart rate, an ethnicity and a medical condition.

In one embodiment the method further comprises selecting the at least one first light cell among the at least a given one of the light cells.

In one embodiment, said selecting the at least one first light cell is constant in time.

In another embodiment, said selecting the at least one first light cell varies in time.

In one embodiment, a number of the least one first light cell varies in time.

In another embodiment, a number of the least one first light cell in constant in time.

In one embodiment, said selecting the at least one first light cell is performed randomly.

In one embodiment, said selecting the at least one first light cell is performed at least partially as a function of a given image of the eye being actually displayed on the display unit.

In one embodiment, said determining the reaction is performed as a function of an intensity of the detected light.

In one embodiment, the intensity comprises one of a peak intensity, a total intensity and an average intensity.

In one embodiment, the intensity comprises a pattern of detected light indicating a measured intensity and a position within the display unit for each one of the at least one first light cell.

In one embodiment, said determining the reaction is performed as a function of an intensity variation of the detected light.

In one embodiment, the intensity variation comprises one of a peak intensity variation, a total intensity variation and an average intensity variation.

In one embodiment, the intensity variation comprises a variation of a pattern of detected light indicating a measured intensity and a position within the display unit for each one of the at least one first light cell.

In one embodiment, said determining the reaction comprises determining a movement for the articulated body part.

In one embodiment, said determining the movement comprises determining at least one of a type of movement and a movement amplitude.

In one embodiment, said determining the reaction comprises determining a sound to be emitted.

A light cell should be understood as any lighting device adapted to emit light having a given wavelength or range of wavelength and a given intensity or power. The wavelength or range of wavelength emitted by a light cell may be adjustable. The intensity of the light emitted by a light cell may be adjustable.

A light cell may a single mode light cell which is adapted to emit light only or a dual mode light cell which is adapted to selectively emit light or detect light. In one embodiment, a dual mode light cell operated as a light detector is adapted to measure the intensity of the light incident thereon.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
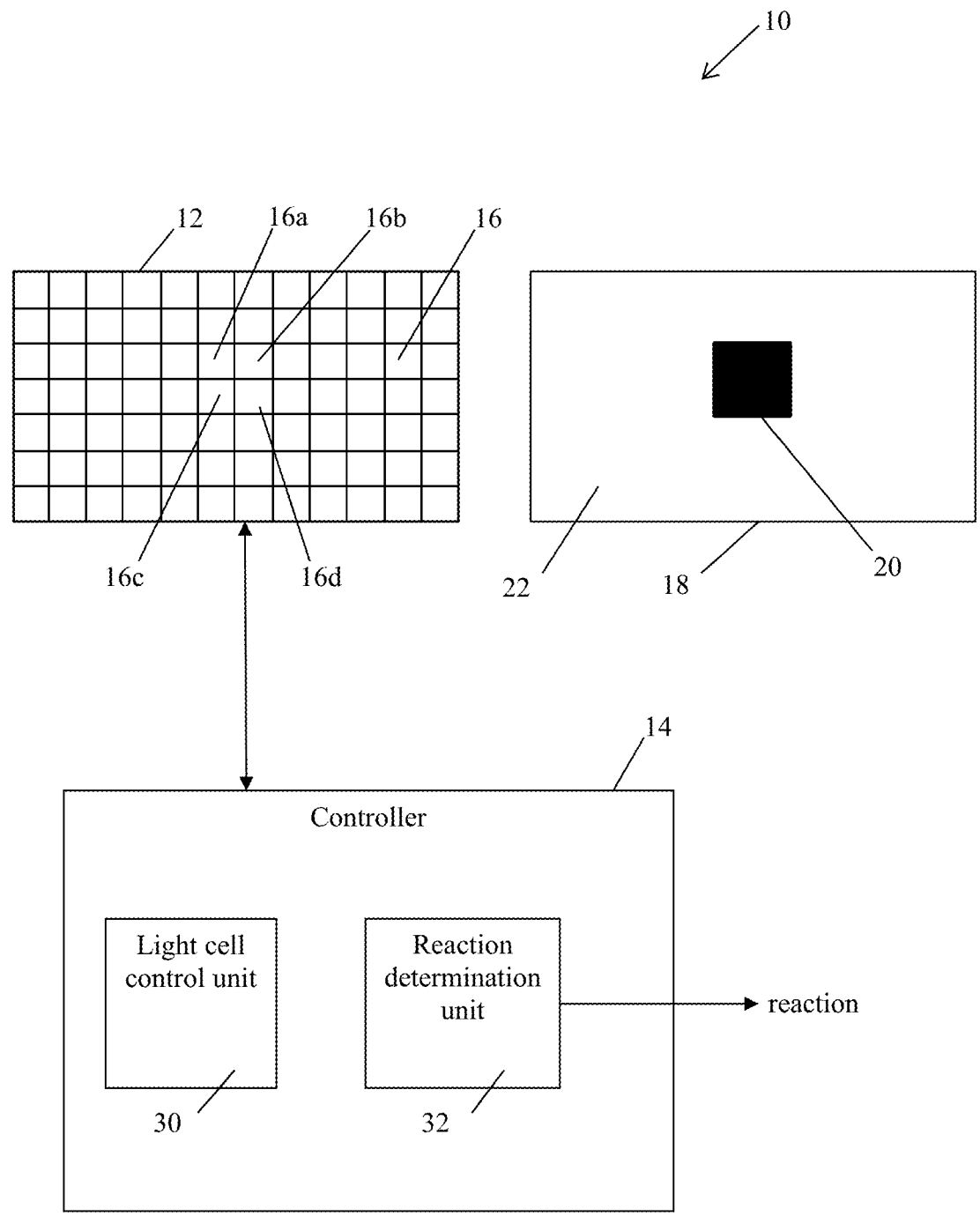
FIG. 1 is a block diagram illustrating an artificial eye system adapted to determine a reaction for the artificial eye system and/or an artificial body in which the artificial eye system is embedded, in accordance with an embodiment.

In the following there is described an artificial eye system which may be used to cause a reaction for an artificial body such as a patient simulator, a mannequin, a robot, a toy or the like. A patient simulator may be adapted to simulate a human being, an animal or the like. There is also described a method for controlling the artificial eye system, i.e. controlling the image of the eye to be displayed thereon. The artificial eye system may be embedded into an artificial body, such as a patient simulator, which comprises at least one head. The artificial body may further comprise a torso, at least one arm, at least one hand, at least one leg, and/or at least one foot, and may mimic a human body, an animal body, a robot body, or the like. For example, the artificial body may correspond to a medical simulator. Some parts of the artificial body may be articulated while other parts may be fixed. The artificial body may also comprise a sound reproduction device for emitting sounds or imitating a voice. In another example, the artificial body may comprise a lachrymal gland reproduction system adapted to discharge tears adjacent to the eyes.

The artificial eye system comprises a display unit on which the image of an eye is displayed and which also operates as a light detector. The artificial eye system further comprises a controller that determines a reaction according to light detected by the display unit. In order to detect and evaluate the light environment, the artificial eye system is adapted to detect surrounding light and/or light propagating towards the artificial eye. The display unit comprises light cells which are each adapted to be operated as a light emitter and of which at least one is adapted to be further operated as a light receiver or detector. The controller is adapted to determine which light cells are to be operated as light detectors to detect the light environment of the display unit and which light cells are to be operated as light emitters to display an image of the eye on the display unit. From the light detected by the light cells operated as light detectors, the controller may determine a light pattern and then determine a reaction according to the detected light pattern. It should be understood that a reaction may correspond to a change of configuration/state for the artificial eye system and/or for the artificial body if the artificial eye system is embedded into an artificial body. For example, a reaction may be a motor reaction, a physiological reaction, etc. A reaction may also correspond to a sound or word(s) generated by the sound reproduction device, tears to be discharged by a lachrymal gland reproduction system, etc.

When the detected light causes a change of configuration for the artificial eye system, the controller is adapted to determine the image of the eye to be displayed on the display unit as a function of the detected light or the determined light pattern. As a result, the controller is adapted to modify the appearance of the eye displayed on the display unit as a function the light incident on the display unit. The appearance of the displayed eye may comprise the intensity of the light emitted by the display unit to display the eye, the shape, size and/or color of at least an element of the displayed eye, the position of at least one element of the displayed eye, and/or the like.

When the detected light causes a change of configuration for the artificial body, the controller is adapted to determine a new configuration for the artificial body as a function of the light detected or the determined pattern of light. For example, the controller may determine a rotation of the head of the artificial body, a movement of an arm to place the hand in front of the display of the artificial eye system, spams to simulate an epileptic seizure, etc.

When the detected light causes a sound to be emitted by the sound reproduction device, the controller is adapted to determine a sound or words to be emitted by the sound reproduction system as a function of the light detected or the determined pattern of light. For example, the controller may control the sound reproduction system for emitting a sound indicative of a pain, words for interacting with the user, etc.

FIG. 1 illustrates one embodiment of an artificial eye system 10 adapted to determine a reaction for the artificial eye system and/or the artificial body. The artificial eye system 10 comprises a display unit or screen 12 for displaying an image of an eye thereon and a controller 14 for controlling for determining a reaction and controlling the display unit 12. The display unit 12 comprises a plurality of light cells 16 which are each operable as a light emitter for emitting light. At least a given one of the light cells 16 is further adapted to detect light and may be selectively operated as a light emitter or a light receiver or detector for detecting light incident thereon. The light cells 16 which can only be operated as light emitters are referred hereinafter to as single mode light cells whereas the given light cells which may be selectively operated as light emitters or light detectors are referred to as dual mode light cells. The display unit 12 comprises mode switching circuitry, as known in the art, for switching the operation mode of the dual mode light cells 16, i.e. for operating each dual mode light cell as either a light emitter or a light detector. The mode switching circuitry may comprise a single electrical circuit adapted for controlling the operation mode of all of the dual mode light cells. In another example, the mode switching circuitry may comprise an electrical circuit for each dual mode light cells so that each dual mode light cell is provided with its own electrical circuit. In a further example, the mode switching circuitry may comprise a plurality of electrical circuits each adapted to control the operation mode of more than one dual mode light cell. In another example, the mode switching circuitry may be embedded into at least one integrated circuit, chip or microchip.

The controller 14 is adapted to generate the image of the eye to be displayed on the display unit 12 and further control the light cells 16 in order to display the image of the eye on the display unit 12.

In one embodiment, the controller 14 comprises at least one physiological model or patient profile stored on a memory and a user of the system 10 may select a given patient profile before using the system 10. The patient profile comprises information about the patient to be simulated. For example, a patient profile may comprise an age, an eye color, a weight, a heart rate, an ethnicity, a medical condition and/or the like for the patient to be simulated. The medical condition information may comprise an identification of a disease, an illness, an injury, any physiologic, mental or psychological condition or disorder, etc. Examples of medical conditions include: coronary heart disease, diabetes, epilepsy, poorly functioning limbs and allergy, strabismus, etc.

Upon selection of a given patient profile by a user, the controller 14 retrieves the information contained in the selected patient profile and uses the retrieved information to generate the image of the eye to be displayed and/or the reaction.

In one embodiment, all of the light cells 16 are dual mode light cells and each light cell 16 may be selectively operated as a light emitter or a light detector. In another embodiment, at least one of the light cells 16 is a dual mode light cell and the other light cells 16 are single mode light cells.

When the system 10 is in operation, an image of an eye such as image 18 is displayed on the display unit 12 and the controller 14 controls the display of the image 108, i.e. the controller 14 generates the image 18 and controls the light cells 16 so that they emit light which will form the image of the eye. For example, the first image displayed on the display unit 12 may be a predefined initial image of an eye which may be determined as a function of a patient profile. The controller 14 is adapted to select at least one light cell to be operated as a light detector among the dual mode light cells 16 in order to determine the light environment of the display unit 12, i.e. to detect the light incident on at least a section of the display unit 12. The dual mode light cells selected to be operated as light detectors are referred to as the first group of light cells hereinafter.

As described in further detail below, the selection of the first group of light cells may vary according to different selection rules. For example, the identification of the light cells of the first group may be constant in time so that the same dual mode light cells are always selected to be operated as light detectors during the use of the system 10. In another example, the identification of the light cells of the first group may vary in time so that a given dual mode light cell may be operated as a light detector at a first point in time and as a light emitter at a second and different point in time. For example, the selection of the first group of light cells may be performed as a function of the image being actually displayed on the display unit 12. For example, when the image 18 of the eye is displayed on the display unit 12, the light cells 16a-16d may be inactive so that they do not emit light in order to appear black and represent the pupil 20 of the eye while the other light cells 16 are operated so as to emit white light in order to display the sclera 22 of the eye. In this case and if the inactive light cells 16a-16d are dual mode light cells, the controller 14 may choose to operate at least one of the inactive cells 16a-16d as a light detector in order to detect the light incident on the display unit 12. As described below, other selection rules may be used to select the first group of light cells.

Once the first group of light cells 16 has been determined, the controller 14 operates the light cells of the first group as light detectors, i.e. controls the mode switching circuitry of the display unit 12 in order to operate the light cells of the first group as light detectors which in turn detect the light incident thereon. The controller 14 then determines a reaction as a function of the light detected by the first group of light cells.

In one embodiment, the controller 14 may further determine the reaction as a function of information contained in a patient profile. For example, if the patient profile indicates that the simulated patient is epileptic and is the detected light corresponds to a stroboscopic light, the controller 14 may determine the reaction to be an epileptic seizure.

In one embodiment, the image of the eye displayed on the display unit does not vary in time and the artificial eye system 10 is embedded in an artificial body. In this case, the reaction determined by the controller 14 may be directed to the configuration of the artificial body and/or a sound to be generated by the sound reproduction system, if any. In one embodiment, the identification of the first group of light cells may be constant in time so that the same dual mode light cells are used as detectors. In another embodiment, the dual mode light cells used as detectors may vary in time.

In another embodiment, the image of the eye displayed on the display unit varies in time and the artificial eye system 10 may be embedded in an artificial body. In this case, the reaction determined by the controller 14 may be directed to the image of the eye displayed on the display unit 12, the configuration of the artificial body and/or a sound to be generated by the sound reproduction system, if any.

When the determined reaction corresponds to a new image of the eye to be displayed, it should be understood that the controller 14 may determine the new image of the eye as a function of the detected light and also as a function of the information contained on the patient profile, if any. For example, if the patient profile indicates that the simulated patient suffers from strabismus, the controller 14 will generate an image of the eye taking into account the identified strabismus.

It should be understood that the dual mode light cells may be at any adequate location within the display unit 12. For example, the dual mode light cells may be randomly distributed. In another example, the dual mode light cells may be evenly distributed within the display unit 12. In a further example, the dual mode light cells may be positioned at specific positions within the display unit 12 as a function of the elements of the eye to be displayed. For example, at least one dual mode light cell may be positioned at each extremity of the displayed eye, at least one dual mode light cell may be positioned at the center of the eye, at least one dual mode light cell may be positioned on the display unit 102 so as to be located at the top of an upper eyelid and/or at the bottom of a lower eyelid, etc.

In one embodiment, a light cell 16 comprises at least one light emitting diode (LED). For example, each light cell 16 may be an RGB LED light cell and comprise a red LED adapted to emit red light, a green LED adapted to emit green light and a blue LED adapted to emit blue light. In another example, each light cell 16 may comprise a yellow LED adapted to emit yellow light and a blue LED adapted to emit blue light. In a further example, a light cell 16 may comprise a white LED such as a phosphor-based LED or the like. It should be understood that any adequate type of LED may be used. For example, a light cell may comprise at least one organic LED (OLED), at least one quantum dot LED, at least one μOLED, at least one small molecule OLED (SMOLED), at least one thin film diode, and/or the like. It should be understood that any device that may be used to iteratively emit light and detect light may be used as a light cell 106.

In one embodiment, the light cells 16 are each adapted to emit light of a predefined color, i.e. light having a predefined wavelength or a predefined wavelength range. In another embodiment, the color of the light emitted by the light cells 16 may vary, i.e. the wavelength or the wavelength range of the light emitted by the light cells 16 may be adjusted. For example, when the light cells 16 each comprise RGB LEDs, the red, green and blue LEDS may be operated so that a given color be emitted by the light cell 16 and the given emitted color may be adjusted and varied by adequately operating the red, green and blue LEDS, as known in the art.

In one embodiment, the intensity of the light emitted by the light cells 16 is fixed and may not be varied. In another embodiment, the intensity of the light emitted by the light cells 16 is adjustable and controllable by the controller 14. For example, the controller 14 may vary the intensity of the light emitted by the light cells of the second group as a function of the intensity of the light detected by the light cells of the first group so as to adjust the brightness of the displayed image as a function of the intensity of the ambient light.

In one embodiment, the light cells 16 are organized according lines and columns to form a matrix of light cells. In one embodiment, the display unit 12 is substantially flat. For example, the display unit 12 may be a flat LED panel. In one embodiment, the system 10 may further comprise a curved lens positioned in front of the display unit 12 to provide the appearance of a human eye for example. In another embodiment, the display unit 12 may be curved. In one embodiment, the shape of the matrix of light cells may be chosen so as to mimic the shape of an eye.

In one embodiment, each one of the light cells 16 is a dual mode light cell adapted to both emit light and detect light and may be selectively operated as a light emitter or a light detector. In this case, the controller 14 may select any light cell 16 to be operated as a light detector. In another embodiment, the light cells 16 comprise at least one dual mode light cell that may be selectively operated as a light emitter or a light detector while the other light cells are single mode light cells that can only be operated as light emitters. In this case, the controller 14 may select given light cells to be operated as light detectors only among the dual mode light cells.

It should be understood that the controller 14 comprises at least a processing unit, a memory and communication means for communicating with communication means of the display unit 12. The processing unit of the controller 14 is configured for operating the light cells of the first group as light detectors, determining the image to be displayed as a function of the detected light and operating the light cells of the second group to display the image on the display unit.

In one embodiment and as illustrated in FIG. 1, the controller 12 comprises a light cell control unit 30 and a reaction determination unit 122. The light cell control unit 30 is adapted to determine the first and second group of light cells, i.e. determine which light cells 16 are to be operated as light emitters and which light cells 16 are to be operated as light emitters. The light cell control unit 30 is further adapted to control the operation mode of each light cell 16. In one embodiment, two operation modes exist for each light cell 16: an emission mode in which a light cell 16 emits light and a detection mode in which a light cell 16 detects light. In another embodiment, three operation modes exist for each light cell 16: the emission mode, the detection mode and an inactive mode in which a light cell 16 does not emit light and does not detect light.

The reaction determination unit 32 is adapted to receive information about the light detected by the light cells operated as light detectors and determine a reaction as a function of the received information about the detected light. As described above, the reaction may be directed to the display unit. In this case the reaction determination unit 32 is adapted to generate an image of the eye as a function of the light detected and transmit the generated image to the light cell control unit 30 which determines the second group of light cells, i.e. which light cells 16 are to be operated as light emitters to display the determined image of the eye on the display unit 12. It should be understood that a given dual mode light cell may be part of the first and second groups, i.e. it may be first chosen to be operated as a light detector to detect light incident on the display unit 12 and then operated as a light emitter to display the image of the eye. The light cell control unit 30 then controls and operates the light cells 106 of the second group to display the determined image of the eye on the display unit 102.

The reaction may also be directed to the artificial body. In this case, the reaction determination unit 32 is adapted to determine a movement for a part of the artificial body and/or a sound to be emitted as a function of the detected light, and output the reaction. When the reaction corresponds to a movement, the reaction determination unit 32 transmits the reaction to the controller that controls the movement of the artificial body. When the reaction corresponds to a sound to be emitted, the reaction determination unit 32 transmits the reaction to the reproduction sound system.

In one embodiment, the light cell control unit 30 and the reaction determination unit 32 are each provided with at least a processing unit, a memory and communication means. The processing unit of the light cell control unit 30 is configured for operating the light cells of the first group as light detectors and operating the light cells of the second group to display the image on the display unit. The processing unit of the reaction determination unit 32 is configured for determining a reaction as a function of the detected light and outputting the reaction.

It should be understood that the system 10 is connectable to a power source such as the grid or a battery for powering at least the display unit 12 and the controller 14.

In the following, the operation of the controller 14 is described in greater detail with respect to FIG. 2.

Figure 2:
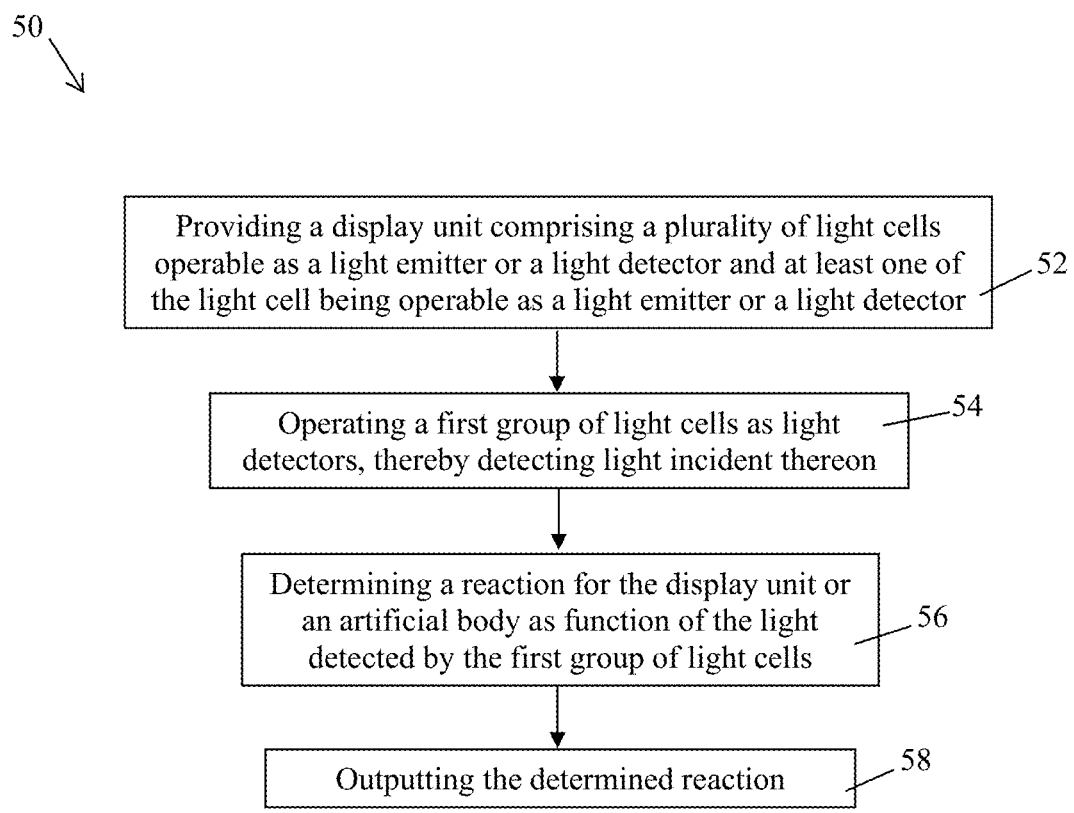
FIG. 2 is a flow chart illustrating a method for generating a reaction according to detected light, in accordance with an embodiment.

FIG. 2 illustrates one embodiment of a method 50 for determining a reaction as a function of a light incident on a display unit. The reaction may be directed to the display unit itself or to an artificial body in which the display unit is embedded. The first step 52 consists in providing a display unit that comprises a plurality of light cells each adapted to emit light. Each light cell may be either a single mode light cell adapted to only emit light or a dual mode light cell adapted to selectively emit light or detect light. The display unit comprises at least one dual mode light cell as described above.

At step 54, at least one dual mode light cell, i.e. the first group of light cells, is operated as a light detector, thereby detecting light incident thereon. The controller 14 controls the mode switching circuitry of the display unit 12 in order to operate the dual mode light cell(s) of the first group each as a light detector.

In one embodiment, the identification of the first group of light cells 16, i.e. the identification of at least one dual mode light cell to be operated as a light detector, is constant in time, i.e. the same dual mode light cell(s) is(are) always used for detecting the light incident on the display unit 12. For example, the display unit 12 may be provided with four dual mode light cells each located at a respective corner of the display unit 12. In this case, the four dual mode light cells are always used for detecting light.

In another embodiment, the identification of the light cells of the first group varies in time. In this case, the method 50 further comprises a step of selecting the dual mode light cells of the first group, i.e. identifying which dual mode light cell(s) is(are) to be operated as light detector(s). The selection of the first group of light cells may be performed according to various selection rules. In one embodiment, the number of dual mode light cells to be operated as light detectors may be constant in time but the position of the selected dual mode light cells within the display unit may vary in time. In another embodiment, the number of dual mode light cells to be operated as light detectors and their position within the display unit may vary in time.

For example, the number and/or position of the light cells of the first group may be chosen randomly among the dual mode light cells contained in the display unit 12.

In another example in which the controller 14 is adapted to generate images of the eye to be displayed on the display unit as a function of the detected light, the identification of the dual mode light cells of the first group may be performed according to the image of the eye being concurrently displayed. If the image of the displayed eye comprises a black pupil, the light cells corresponding to the pupil do not emit light so that they appear black to form the pupil. In this case and if at least one of the light cells forming the pupil is a dual mode light cell, the controller 14 may select the dual mode light cells forming the pupil to be operated as light detectors. If the image of the displayed eye comprises eyelashes, the light cells corresponding to the eyelashes do not emit light so that they appear black to form the eyelashes. In this case and if at least one of the light cells forming the eyelashes is a dual mode light cell, the controller 14 may select the dual mode light cells forming the eyelashes to be operated as light detectors.

In a further embodiment, the identification of some of the dual mode light cells to be operated as light detectors may be constant in time, i.e. some of the dual mode light cells may always be part of the first group, while the identification of the other dual mode light cells to be operated as light detectors may vary in time, i.e. some dual mode light cells may be operated as light detectors at given time and may not be operated as light detectors at another time. For example, the display unit 12 may comprise four dual mode light cells each located at a respective corner thereof and twenty other dual mode light cells evenly distributed within the display unit 12 and the controller may be adapted to always select eight dual mode light cells to be operated as light detectors. In this case, the controller 14 may always select the four dual mode light cells located at the corner of the display unit 122 to be operated as light detectors and further select four dual mode light cells among the other twenty dual mode light cells to also be operated as light detectors.

The dual mode light cells of the first group are then operated as light detectors and detect light. The controller 14 then receives information about the detected light from the display unit 12 and determines a reaction as a function of the information about the detected light at step 56. The reaction may be directed towards the artificial eye system and/or the artificial body, as described above.

In one embodiment, the information about the detected light comprises information about the intensity of the detected light. For example, the controller 14 may receive the total light intensity detected by the dual mode light cells operated as light detectors. In another example, the information about the intensity may comprise the average intensity detected by the dual mode light cells operated as light detectors. In a further embodiment, the controller 14 may receive the light intensity detected by each dual mode light cell operated as a light detector. In this case, the controller 14 may generate a pattern of detected light which indicates the light intensity detected by each dual mode light cell of the first group as a function of the position within the display unit of the respective dual mode light cell.

The controller 14 then generates the reaction as a function of the received information about the light intensity. For example, the generated reaction may depend on the total detected intensity or the average detected intensity. For example, the controller 14 may access a database which may be stored externally or locally on an internal memory and the database may comprise a respective predefined reaction for different possible value of total intensity or average intensity. It should be understood that more than one reaction may be associated with a given detected light. For example, the database may comprise a first reaction for the artificial eye system and a second reaction for the artificial body both associated with a same value of total intensity or average intensity.

In an embodiment in which it is adapted to determine a pattern of detected light, the controller 14 is adapted to determine the reaction as a function of the determined pattern of detected light. In one embodiment, the controller 14 may access a database stored locally or externally which contains at least one respective reaction for each possible pattern of detected light. In this case, the controller 14 retrieves the reaction corresponding to the pattern of detected light.

In one embodiment, the determination of the reaction may be determined as a function of the variation in time of the information about the detected light. In this case, the controller 14 is adapted to compare the information about the detected light received at a given point in time to the information received at a previous point in time, and determine the reaction as a function of the variation of the information between the two points in time.

In an embodiment in which the information about the detected light comprises a total or average light intensity, the controller 14 then determines the variation of total or average intensity and determines the reaction according to the determined variation of total or average intensity.

In an embodiment in which it determines patterns of detected light, the controller 14 may determine a variation between two patterns of detected light and generate the reaction according to the variation between the two patterns of detected light.

It should be understood that the controller 14 may generate no reaction if no variation of the information of detected light is detected or if the detected variation is below a given threshold.

In an embodiment in which the system 10 comprises a database of predefined patterns of light and corresponding reactions, the controller 14 is adapted to compare the pattern of detected light to the predefined patterns of light stored in the database in order to retrieve the reaction. In one embodiment, the controller 14 may be adapted to use interpolation algorithms to determine the reaction when the pattern of detected light does not exactly correspond to a predefined pattern of light stored in the database.

Referring back to FIG. 2, after determining the reaction, the controller 14 outputs a command indicative of the determined reaction at step 58. When the reaction is directed to the artificial eye system, the controller 14 transmits the determined reaction to the display unit 12. For example, when the reaction is an image to be displayed on the display unit 12, the controller 14 transmits the new image of the display unit 12 to be displayed thereon. When the reaction is directed to the artificial body, the controller 14 transmits the reaction to the control device that controls the artificial body which applies the reaction. For example, when the reaction corresponds to a sound, word or sentence to be emitted by the artificial body, the controller 14 transmits the reaction to the sound reproduction device. When the reaction corresponds to a movement of a given body part, the controller 14 transmits the reaction to the control device that controls the given body part.

Figure 3:
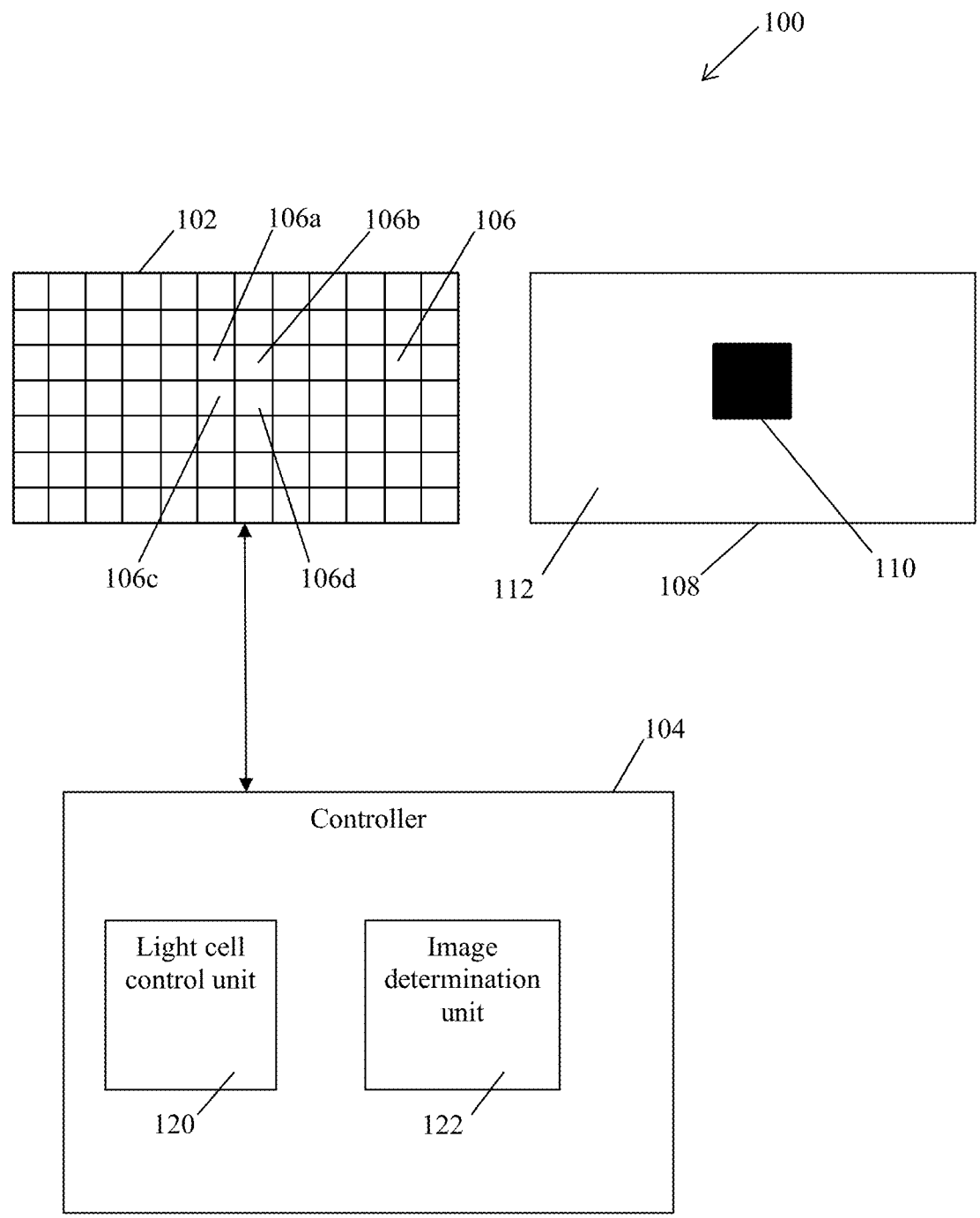
FIG. 3 is a block diagram illustrating an artificial eye system adapted to modify an image of an eye displayed thereon as a function of detected light, in accordance with an embodiment.

FIG. 3 illustrates one embodiment of an artificial eye system 100 adapted to generate a reaction for the artificial eye system 100 itself, i.e. generate an image an eye to be displayed according to detected light. The artificial eye system 100 comprises a display unit or screen 102 for displaying an image of an eye thereon and a controller 104 for controlling the image of the eye displayed on the display unit 102. The display unit 102 comprises a plurality of light cells 106 which are each operable as a light emitter for emitting light and at least a given one of the light cells 106 is further adapted to detect light and may be selectively operated as a light emitter or a light receiver or detector for detecting light incident thereon. The light cells 106 that can only be operated as light emitters are referred hereinafter to as single mode light cells whereas the given light cells that may be selectively operated as light emitters or light detectors are referred to as dual mode light cells. The display unit 102 comprises mode switching circuitry, as known in the art, for switching the operation mode of the dual mode light cells 106, i.e. for operating each dual mode light cell as either a light emitter or a light detector. The mode switching circuitry may comprise a single electrical circuit adapted for controlling the operation mode of all of the dual mode light cells. In another example, the mode switching circuitry may comprise an electrical circuit for each dual mode light cells so that each dual mode light cell is provided with its own electrical circuit. In a further example, the mode switching circuitry may comprise a plurality of electrical circuits each adapted to control the operation mode of more than one dual mode light cell. In another example, the mode switching circuitry may be embedded into at least one integrated circuit, chip or microchip.

The controller 104 is adapted to generate the image of the eye to be displayed on the display unit 102 and further control the light cells 106 in order to display the image of the eye on the display unit 102. As described above, the controller 104 is adapted to select the first group of light cells 106 to be operated as light detectors.

As described in further detail below, the selection of the first group of light cells may vary according to different selection rules. For example, the identification of the light cells of the first group may be constant in time so that the same dual mode light cells are always selected to be operated as light detectors during the use of the system 100. In another example, the identification of the light cells of the first group may vary in time so that a given dual mode light cell may be operated as a light detector at a first given point in time and as a light emitter at a second and different point in time. For example, the selection of the first group of light cells may be performed as a function of the image being actually displayed on the display unit 102. For example, when the image 108 of the eye is displayed on the display unit 102, the light cells 106a-106d may be inactive so that they do not emit light in order to appear black and represent the pupil 110 of the eye while the other light cells 106 are operated so as to emit white light in order to display the sclera 112 of the eye. In this case and if the inactive light cells 106a-106d are dual mode light cells, the controller 104 may choose to operate at least one of the inactive cells 106a-106d as a light detector in order to detect the light incident on the display unit 102. As described below, other selection rules may be used to select the first group of light cells.

Once the first group of light cells 106 has been determined, the controller 104 operates the light cells of the first group as light detectors, i.e. controls the mode switching circuitry of the display unit 102 in order to operate the light cells of the first group as light detectors which in turn detect the light incident thereon. The controller 104 then determines the image of the eye to be displayed on the display unit 102 as a function of the light detected by the first group of light cells. For example, the image to be displayed may be generated by the controller 104 as a function of the intensity of the detected light. Once the image has been generated, the controller 104 determines which light cells should emit light in order to display the generated image. The light cells selected to emit light in order to display the image are hereinafter referred to as the second group of light cells 106. The light cells 106 of the second group can be single mode light cells and/or dual mode light cells operated as light emitters. The controller 104 further operates the light cells of the second group so that the display unit 102 displays the image generated by the controller 104.

As a result, the controller 104 allows displaying the image of an eye on the display unit 102 and the appearance of the displayed eye may change according to changes to the light environment of the display unit 102. For example, increasing the intensity of the light incident on display unit 102 may trigger the reduction of the size of the pupil or the closing of the eyelids. In another example, decreasing the intensity of the ambient light may trigger the decrease of the intensity of the light emitted by the light cells 106 to display the image of the eye.

It should be understood that the controller 104 comprises at least a processing unit, a memory and communication means for communicating with communication means of the display unit 102. The processing unit of the controller 104 is configured for operating the light cells of the first group as light detectors, determining the image to be displayed as a function of the detected light and operating the light cells of the second group to display the image on the display unit.

In one embodiment and as illustrated in FIG. 1, the controller 102 comprises a light cell control unit 120 and an image determination unit 122. The light cell control unit 120 is adapted to determine the first and second group of light cells, i.e. determine which light cells 106 are to be operated as light emitters and which light cells 106 are to be operated as light emitters. The light cell control unit 120 is further adapted to control the operation mode of each light cell 106. In one embodiment, two operation modes exist for each light cell 106: an emission mode in which a light cell emits light and a detection mode in which a light cell detects light. In another embodiment, three operation modes exist for each light cell: the emission mode, the detection mode and an inactive mode in which a light cell does not emit light and does not detect light.

The image determination unit 122 is adapted to receive information about the light detected by the light cells operated as light detectors and determine the next image of the eye to be displayed as a function of the received information about the detected light. The determined image is sent to the light cell control unit 120 which determines the second group of light cells, i.e. which light cells 106 are to be operated as light emitters to display the determined image of the eye on the display unit 102. It should be understood that a given dual mode light cell may be part of the first and second groups, i.e. it may be first chosen to be operated as a light detector to detect light incident on the display unit 102 and then operated as a light emitter to display the image of the eye. The light cell control unit 120 then controls and operates the light cells 106 of the second group to display the determined image of the eye on the display unit 102.

In one embodiment the light cell control unit 120 and an image determination unit 122 are each provided with at least a processing unit, a memory and communication means. The processing unit of the light cell control unit 120 is configured for operating the light cells of the first group as light detectors and operating the light cells of the second group to display the image on the display unit. The processing unit of the image determination unit 122 is configured for determining the image to be displayed as a function of the detected light.

In the following, the operation of the controller 104 is described in greater detail with respect to FIG. 4.

Figure 4:
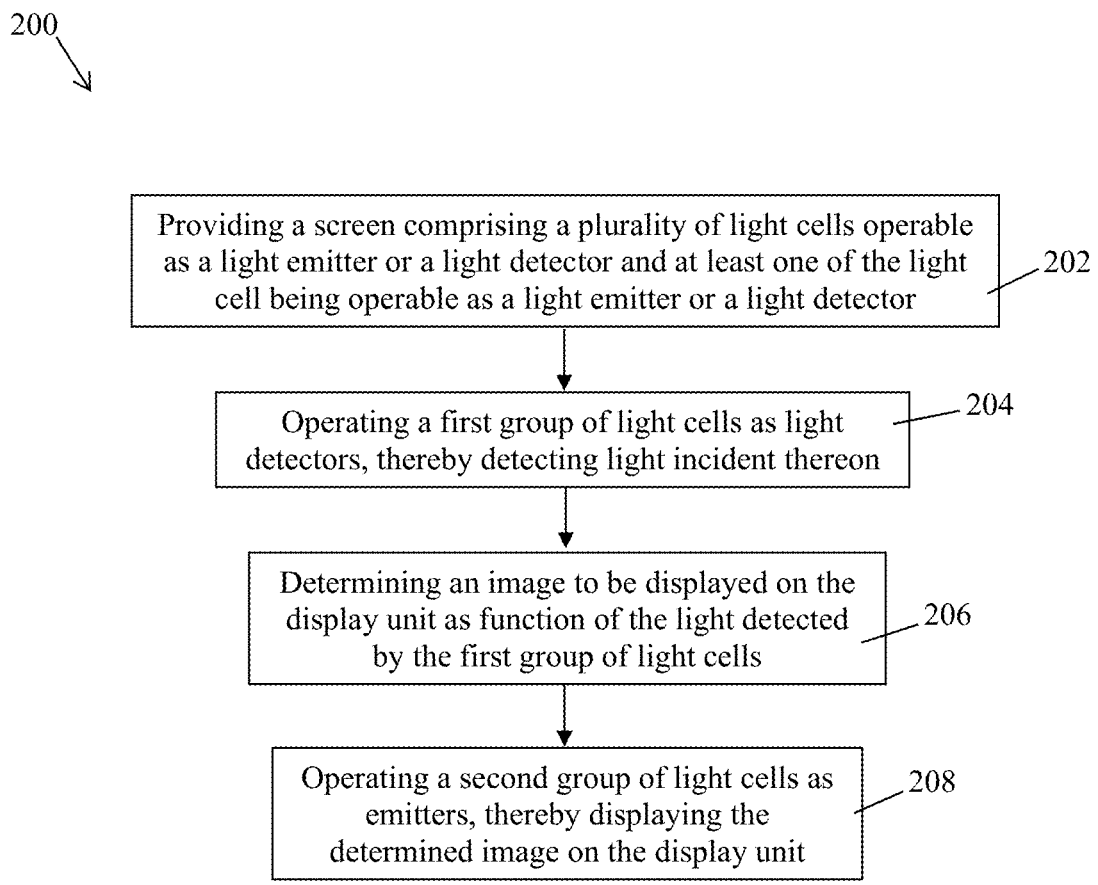
FIG. 4 is a method for displaying an image of an eye on a display unit, in accordance with an embodiment.

FIG. 4 illustrates one embodiment of a method 200 for displaying an image of an eye on a display unit. The first step 202 consists in providing a display unit comprising a plurality of light cells each adapted to emit light. Each light cell may be either a single mode light cell adapted to only emit light or a dual mode light cell adapted to selectively emit light or detect light. The light cells of the display unit comprise at least one dual mode light cell as described above.

At step 204, at least one dual mode light cell, i.e. the first group of light cells, is operated as a light detector, thereby detecting light incident thereon. The controller 104 controls the mode switching circuitry of the display unit 102 in order to operate the dual mode light cell(s) of the first group each as a light detector.

The dual mode light cells of the first group are then operated as light detectors and detect light. The controller 104 then receives information about the detected light from the display unit and generates an image of the eye to be displayed on the display unit 102 as a function of the information about the detected light at step 206.

In one embodiment, the information about the detected light comprises information about the intensity of the detected light. For example, the controller 104 may receive the total light intensity detected by the dual mode light cells operated as light detectors. In another example, the information about the intensity may comprise the average intensity detected by the dual mode light cells operated as light detectors. In a further embodiment, the controller 104 may receive the light intensity detected by each dual mode light cell operated as a light detector. In this case, the controller 104 may generate a pattern of detected light which indicates the light intensity detected by each dual mode light cell of the first group as a function of the position within the display unit of the respective dual mode light cell.

The controller 104 then generates the image of the eye to be displayed as a function of the received information about the light intensity. For example, the generated image may depend on the total detected intensity or the average detected intensity. For example, the controller 104 may comprise a database stored on its memory and database may comprise a respective predefined eye image for different possible value of total intensity or average intensity. In one embodiment, the database may also comprise a predefined brightness of the image for each possible value of total or average intensity. Brightness may be defined by a total intensity of light to be emitted when displaying the image and may be characterized by a predefined number of light cells for the second group and/or a predefined intensity for the light to be emitted by the light cells of the second group. In another example, the database may comprise a value for at least one characteristic of the image to be displayed for each possible value of total intensity or average intensity. For example, when the displayed eye comprises only a sclera and a pupil, the database may comprise a respective value for the size of the pupil for each possible value of total intensity or average intensity. For example, when the detected total or average intensity increases, the size of the pupil such as its diameter if the pupil has a circular shape decreases, and vice versa. The controller 104 then retrieves the size of the pupil from the database using the received detected average or total intensity and generates an image of eye in which the pupil has the retrieved size.

In an embodiment in which it is adapted to determine a pattern of detected light, the controller 104 is adapted to generate the image of the eye as a function of the determined pattern of detected light. In one embodiment, the controller 104 may comprise a database which contains a respective image of the eye for each possible pattern of detected light. In this case, the controller 104 retrieves the image of the eye corresponding to the pattern of detected light. In another embodiment, the database may contain at least one characteristic for at least one element of the eye to be displayed for each possible pattern of detected light. In this case, the controller 104 retrieves the characteristic(s) corresponding to the pattern of detected light and generates the image of the eye to be displayed according to the retrieved characteristics. For example, the characteristics stored in the database may comprise the size of a pupil, the position of a pupil, the size and position of an upper and/or lower eyelid, the position and/or size of eyelashes, the brightness of the sclera, and/or the like.

In one embodiment, the generation of the image of the eye may be determined as a function of the variation in time of the information about the detected light. In this case, the controller 104 is adapted to compare the information about the detected light received at a given point in time to the information received at a previous point in time, and generate the image of the eye as a function of the variation of the information between the two points in time.

In an embodiment in which the information about the detected light comprises a total or average light intensity, the controller 104 then determines the variation of total or average intensity and modifies the displayed eye according to the determined variation of total or average intensity. For example, a variation of the total or average intensity may correspond to a respective size variation of the pupil. The controller 104 then modifies the size of the displayed pupil according to the retrieved size variation. In another example, the variation of the total or average intensity may correspond to a respective brightness variation for the image. The controller 104 then adjusts the intensity of the light emitted by the light cells of the second group as a function of the detected average or total intensity.

In an embodiment in which it determines patterns of detected light, the controller 104 may determine a variation between two patterns of detected light and generate an image to be displayed according to the variation between the two patterns of detected light. For example, when a light beam is propagated towards the display unit 102 and swept along the display unit 102, the distribution of the light intensity within the patterns of detected light will vary according to the displacement of the spot of light on the screen. For example, when the spot of light on the display unit 102 is swept from left to right, the detected maximum intensity in the pattern of the detected light will also move from left to right. As a result, the controller 104 may generate images of the eye in which the pupil moves from left to right to follow the displacement of the spot of light on the display unit 102.

It should be understood that the controller 104 may not modify the displayed image of no variation of the information of detected light is detected or if the detected variation is below a given threshold.

In an embodiment in which the system 100 comprises a database of predefined patterns of light and corresponding images or characteristics for an image, the controller 104 is adapted to compare the pattern of detected light to the predefined patterns of light stored in the database in order to retrieve the image to be displayed or the characteristics of the image. In one embodiment, the controller 104 may be adapted to use interpolation algorithms to determine the image to be displayed or the characteristics of the image when the pattern of detected light does not exactly correspond to a predefined pattern of light stored in the database.

Referring back to FIG. 4, after determining the new image to be displayed, the controller 104 operates a second group of light cells as light emitters in order to display the new image of the eye on the display unit 102, at step 208. The second group of emitters may comprise single mode light cells and/or dual mode light cells. The controller 104 controls the second group of light cells by transmitting control information to the display unit 102. The control information is determined according to the determined image of the eye to be generated on the display unit 102. The control information may comprise information such as the operation mode, the intensity of the light to be emitted, the color, wavelength or wavelength range of the light to be emitted and/or the like, for each light cell of the second group. The display unit 102 then activates the light cells of the second group according to the received control information in order to display the image of the eye thereon.

In one embodiment, all of the light cells 106 may be contained in the second group so that all of the light cells 106 are used as light emitters in order to display the image of the eye.

In another embodiment, only some of the light cells of the display unit 102 are used for displaying the image. In this case, the method 200 further comprises a step of identifying the light cells of the second group, i.e. selecting the light cells to be operated as light emitters to display the image of the eye. In this case, it should be understood that the second group of light cells may comprise single mode light cells and/or dual mode light cells. For example, only the single mode light cells may be contained the second group and used as light emitters for displaying the image of the eye. In another example, the second group of light cells may comprise all of the single mode light cells and at least one dual mode light cell. In a further example, the second group of light cells may comprise some of the single mode light cells and at least one dual mode light cell.

In one embodiment, the controller 104 further selects dual mode light cells to be operated as light detectors using the above-described method concurrently to the selection of the second group of light cells. In this case, the light cells of the second group are used to display the image of the eye while the selected dual mode light cells are operated as light detectors for detecting the light incident of the display unit while the new image of the eye is being displayed.

In one embodiment, no image is displayed on the display unit at the beginning of the method 200. The display unit 102 then appears black and all of the dual mode light cells may be operated as light detectors. An image of the eye is displayed only when the light incident on the display unit 102 has been detected.

In another embodiment, an initial predefined image of the eye is displayed on the display unit 102 at the beginning of the method 200. In one embodiment, all of the light cells may be operated as light emitters to display the initial predefined image. In another embodiment, only some of the light cells may be operated as light emitters for displaying the initial predefined image. If some of the light cells that are not operated as light emitters are dual mode light cells, these unused dual mode light cells may be operated as light detectors while the initial predefined image is displayed.

It should be understood that the image of the eye displayed on the display unit 102 comprises at least a sclera and a pupil. The characteristics of the sclera and the pupil such as their shape, size, color, and/or the like may vary. For example, an eye may comprise a rectangular black sclera and a square red pupil. In another example, the sclera may have the shape of a human eye and be white while the pupil is circular and black.

In one embodiment, the image of the eye further comprises an iris, an upper eyelid, a lower eyelid, eyelashes, a lacrimal caruncle and/or the like to mimic a human eye. The image of the eye may comprise further elements such as blood, blood vessels, marks and/or the like to mimic a medical condition or disease. The color of the sclera may be changed to yellow for example in order to mimic a disease of the liver.

The above-described artificial eye system 100 may be embedded in a body part such as a head or in a body such as a patient simulator, a mannequin, a robot, a toy or the like. The body part or the body may comprise more than one artificial eye system 100.

Figure 5:
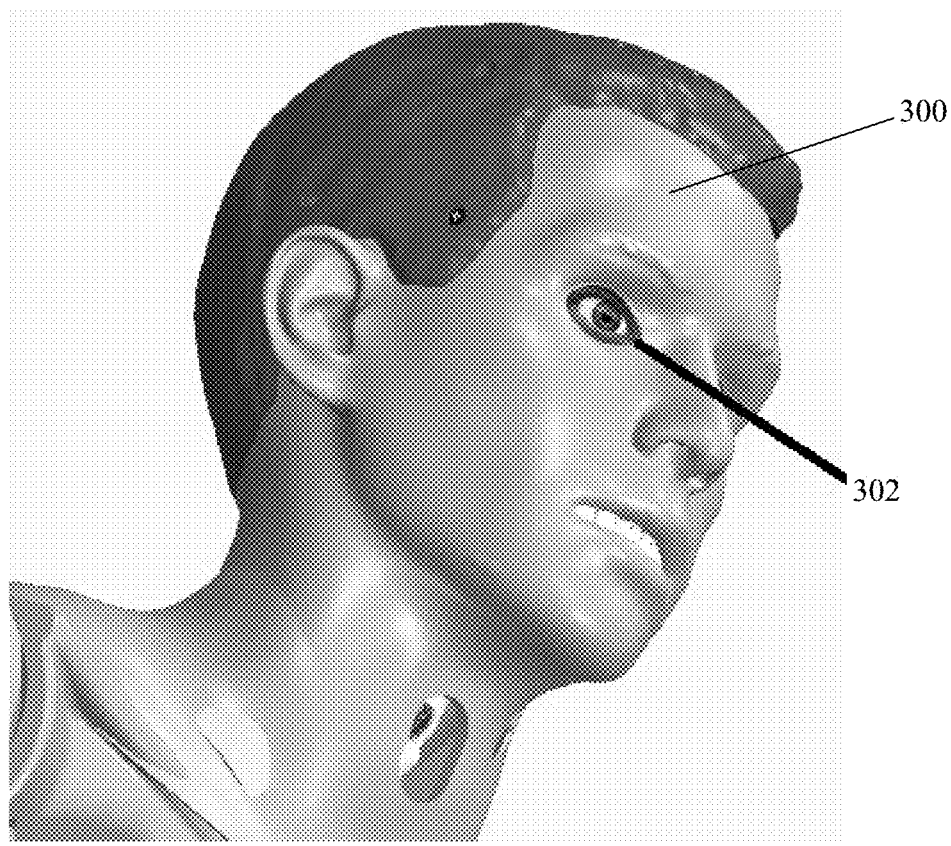
FIG. 5 illustrates a head of a patient simulator provided with two artificial eye systems, in accordance with an embodiment.
Figure 6:
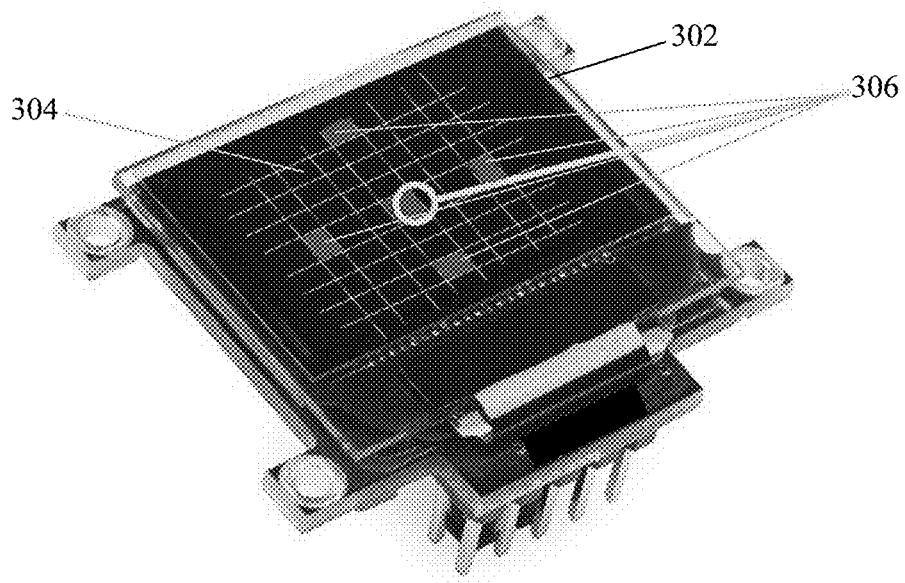
FIG. 6 illustrates a display unit provided with five dual mode light cells, in accordance with an embodiment.

For example, FIG. 5 illustrates one embodiment of a patient simulator 300 adapted for medical training purposes and simulating medical procedures. The patient simulator 300 is provided with two display unit 302 for displaying the eyes of the patient simulator 300 and at least one controller (not shown) to control the two artificial eyes 302. As illustrated in FIG. 6, each display unit 302 may be a µOLED panel comprising a plurality of µOLED light cells 304. In one example, five µOLED light cells 3065 may be dual mode light cells to be each operated as either a light emitter or a light detector while the other µOLED light cells 304 can only light emitters.

A single controller may be used for controlling the images displayed on the two display units 302. Alternatively, each display unit 302 may be provided with a respective controller. In this case, each controller controls its respective display unit 302 independently of the other.

When a single controller is used for controlling two display units 302, the single controller may control each display unit 302 independently of the other. Alternatively, the single controller may control both display units 302 according the light incident on both display units 302 so that the light detected by one display unit 302 may influence the image of the eye displayed on the other display unit 302. For example, the controller may generate an image for each display unit 302 as a function of the total or average light intensity detected by the two display units 302 or the variation of total or average light intensity detected by the two display units 302 so that the light detected by one of the two display units 302 may affect the generation of the image of the eye for the other display unit 302. In another example, the controller is adapted to generate a pattern of detected light for each display unit 302 as described above and generate an image for each display unit 302 as a function of the pair of patterns of detected light or the variation in the pair of patterns of detected light. For example, if the pattern of detected light varies for one of the two display units 302, i.e. the first display unit 302, but does not vary for the other display unit 302, i.e. the second display unit 302, the controller may determine a new image to be displayed on the first display unit according to the change of pattern of detected light and display the same new image of the second display unit 302 even if no change has been detected in the pattern of detected light for the second display unit 302. For example, if it determines for the first display unit 302 a new image in which the position of the pupil changes, the controller applies the same change of position for the pupil displayed on the second display unit 302 even if the pattern of detected light for the second display unit 302 indicates does not vary.

FIG. 7, 8a-8c and 9a-9c illustrate one embodiment of the operation of a controller configured to move the pupils of a patient simulator according to the displacement of a beam of light incident on one eye of the patient simulator, i.e. on one of the two display units of the patient simulator.

Figure 7:
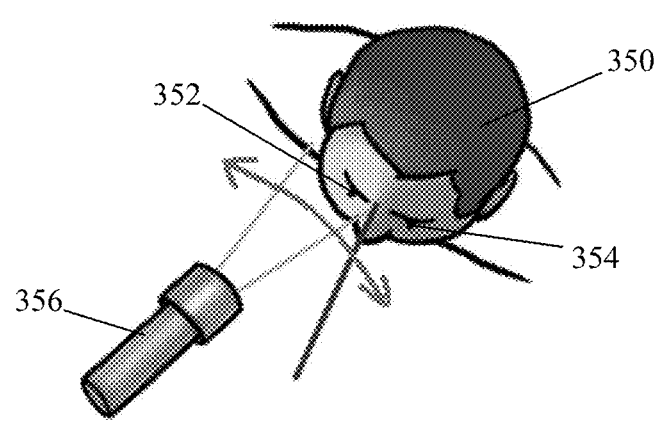
FIG. 7 illustrates the propagation of a light beam towards a right eye of a patient simulator, in accordance with an embodiment.

As illustrated in FIG. 7, a patient simulator 350 is provided with two artificial eyes 352 and 354 which each comprise a display unit on which an image of an eye is displayed. A light source 356 emits a light beam towards the eye 352 and the light source 356 is rotated or moved so that the light beam sweeps the eye 352 from the right of the eye 352 to the left thereof. Each eye 353, 354 comprises a display unit formed of a plurality of light cells of which six of them are dual mode light cells. More particularly, each display unit comprises nine columns of light cells and four rows of light cells. The first, fifth and ninth light cells of the first row and the first, fifth and ninth light cells of the fourth row are dual mode light cells. The other light cells are single mode light cells.

Figure 8A:
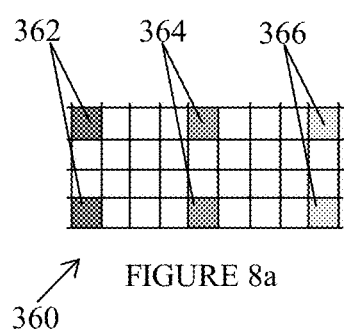
FIGS. 8*a*-8*c* each illustrates a pattern of detected light, in accordance with an embodiment.
Figure 8B:
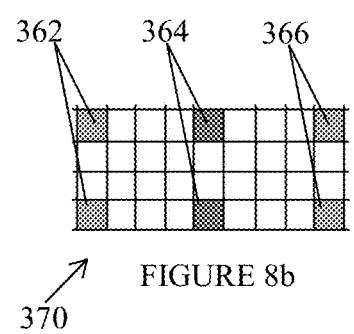
Figure 8C:
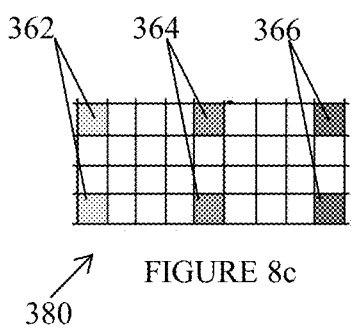

FIGS. 8a-8c illustrated the pattern of detected light that is determined at three different times during the sweeping of the light beam. During the sweeping of the light beam, the six dual mode light cells are operated as light detectors and each dual mode light cell detects the intensity of the light incident thereon.

Figure 9A:
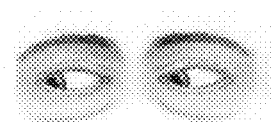
FIGS. 9a-9c each illustrates a respective eye configuration for each one of the patterns of detected light of FIGS. 6a-6c, in accordance with an embodiment.

FIG. 8a illustrates the pattern of detected light 360 at the beginning when the light beam is directed towards the right of the eye 352. The pattern of detected light indicates that the two dual mode light cells 362 located on the first column of the matrix detect the greatest light intensity while the two dual mode light cells 364 located in the fifth column detect an intensity which is less than the greatest intensity but greater than that detected by the two dual mode light cells 366 located in the ninth column. Such a pattern of detected light indicates that the peak of intensity of the light detected by the display unit is located on the right end of the eye 352. As a result and as illustrated in FIG. 9a, the controller generates an image of the eyes 352 and 354 as a function of the location of the intensity peak, i.e. an image in which the pupil is located at the right of the eye 352, 354 where the intensity peak has been detected.

Figure 9B:
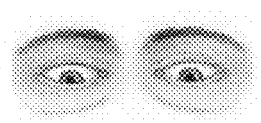

FIG. 8b illustrates the pattern of detected light 370 when the light beam is directed towards the center of the eye 352. The pattern of detected light indicates that the two dual mode light cells 364 located on the fifth column of the matrix detect the greatest light intensity while the two dual mode light cells 362 located in the first column and the two dual mode light cells 366 located in the ninth column detect substantially the same intensity which is less than the greatest intensity. Such a pattern of detected light indicates that the peak of intensity of the light detected by the display unit is substantially at the center of the eye 352. As a result and as illustrated in FIG. 9b, the controller generates an image of the eyes 352 and 354 as a function of the location of the intensity peak, i.e. an image in which the pupil is located at the center of the eye 352, 354 where the intensity peak has been detected.

Figure 9C:
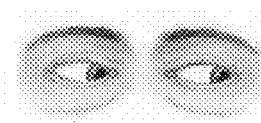

FIG. 8c illustrates the pattern of detected light 380 at the end when the light beam is directed towards the left of the eye 352. The pattern of detected light indicates that the two dual mode light cells 366 located on the ninth column of the matrix detect the greatest light intensity while the two dual mode light cells 364 located in the fifth column detect an intensity which is less than the greatest intensity but greater than that detected by the two dual mode light cells 362 located in the first column. Such a pattern of detected light indicates that the peak of intensity of the light detected by the display unit is located on the left end of the eye 352. As a result and as illustrated in FIG. 9c, the controller generates an image of the eyes 352 and 354 as a function of the location of the intensity peak, i.e. an image in which the pupil is located at the left of the eye 352, 354 where the intensity peak has been detected.

The person skilled in the art will understand that the position of the intensity peak, and therefore the desired position for the pupil, can be determined from the light intensity measured by the dual mode light cells 362, 364 and 366 operated as light detectors. For example, the controller may be adapted to calculate the displacement of the light spot on the display unit from one measure to another and predict the path of the light beam using the calculated displacement. The controller may then use the predicted path to choose the dual mode light cells that should be operated as light detectors, determine the next position for the light spot and the next position of the pupil, and/or the like Referring back to FIGS. 1 and 2, the artificial eye system 10 may be adapted to determine a reaction or reaction command for an artificial body. In one embodiment, the artificial body may comprise a head, a torso, at least one arm, at least one hand, at least one leg, and/or at least one foot, and at least one of the body parts is articulated and movable. In this case, the artificial body is further provided with a motion control device that is adapted to control the motion of the movable body part. In the same or another embodiment, the artificial body comprises a sound reproductions system comprising at least one speaker to emit sound and optionally simulate a voice.

In an embodiment in which the reaction corresponds to a motion for a body part, the controller 14 accesses a database which contains predefined motions for respective detected light information. For example, the database may contain predefined motions for respective values of total or average light intensities. In another example, the database may contain predefined motions for respective possible light patterns. In an embodiment in which the artificial body comprises more than one movable body part, the database further comprise an identification of the body part to be moved in addition to an identification of the movement to be performed. It should be understood that any adequate definition of a movement can be used. For example, a movement may be defined as type of movement such as a rotation, an extension, a contraction, a vibration or the like, and optionally a movement range such as a range of degrees. An exemplary movement may comprise a rotation of the head by 90 degrees. It should be understood that the movement range may also be defined by a final position for the body part.

For example, the artificial eye system 10 may be integrated into a patient simulator having an articulated head and the controller 14 may be adapted to determine movement of the head as a function of the detected light. For example, the controller 14 may output a command indicative that the head of the patient simulator must be rotated by 90 degrees in order to move away from a light source.

In another example and following the propagation of a stroboscopic light towards the display unit 12, the controller 14 may determine uncontrolled jerking movement for the artificial body to simulate an epileptic seizure.

In another example, the patient simulator may have articulated arms and hands and the controller may be adapted to move the arms and/or hands as a function of the light detected by the display units forming the eyes of the patient simulator. For example, when a high intensity light is detected by an eye of the mannequin, the controller 14 may be adapted to move an arm of the patient simulator so as to position a hand in front the eyes of the patient simulator in addition to closing the eyes of the patient simulator.

In an embodiment in which the artificial body is provided with a sound reproduction device, the controller 14 accesses a database containing predefined sounds to be emitted by the sound reproduction device for respective detected light information and retrieves the sound that corresponds to the receive detected light information. For example, the database may contain predefined sounds for respective values of total or average light intensities. In another example, the database may contain predefined sounds for respective possible light patterns. For example, the database may comprise sentences to be pronounced, sounds corresponding to cries of pain, sigh of relief, sneeze, etc. or the like. It should be understood that a sound may correspond to a word, a sentence, or the like.

For example, the database may contain sounds as a function of the intensity of the detected light. If the intensity is greater than a threshold, the controller may determine that the sentence "too bright" corresponds to the detected light intensity and outputs a command indicative of the determined sentence. A command indicative of the sentence is then sent to the sound reproduction device.

It should be understood that the controller 10 may determine more than one reaction for a detected light. For example, if it determines that the intensity of the detected light is greater than a given threshold, the controller may determine that the eyes must be closed while the head of the artificial body is rotated away from the light and the sound production device pronounces the sentence "too bright".

In one embodiment, the artificial eye system 10, 100 is further provided with a light sensor adapted to measure the wavelength of the light incident thereon. In this case, the controller receives the wavelength or range of wavelength detected by the light sensor and generates the image of the eye to be displayed on the display unit as a function of the light detected by the first group of light cells and also as a function of the measured wavelength. In one embodiment, the light sensor is embedded into the display unit.

In one embodiment, the artificial eye system 10 may be embodied in a mask to be worn by a standardized patient for training medical staff.

In one embodiment, the above-described methods may be each embodied as a system comprising is a processing module for executing the steps of the method 10, a memory and at least one communication bus for interconnecting these components. The processing module typically includes one or more Computer Processing Units (CPUs) and/or Graphic Processing Units (GPUs) for executing modules or programs and/or instructions stored in memory and thereby performing processing operations. The communication buses optionally include circuitry (sometimes called a chipset) that interconnects and controls communications between system components. The memory includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory optionally includes one or more storage devices remotely located from the CPU(s). The memory, or alternately the non-volatile memory device(s) within the memory, comprises a non-transitory computer readable storage medium. In some embodiments, the memory, or the computer readable storage medium of the memory stores the following programs, modules, and data structures, or a subset thereof:

a light cell control module for controlling the light cells; and a reaction or image determining module for determining a reaction and/or an image of an eye to be displayed;

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory may store a subset of the modules and data structures identified above. Furthermore, the memory may store additional modules and data structures not described above.

Each of the above-described method may be embodied as a computer program product comprising a computer readable memory storing computer executable instructions thereon that when executed by a computer perform the step of the method.

The embodiments of the invention described above are intended to be exemplary only. The scope of the invention is therefore intended to be limited solely by the scope of the appended claims.

We claim:

1. An artificial body comprising:
   at least a head; and
   a system for controlling the artificial body, the system being embedded into the head and comprising:
   a display unit for displaying an image of an eye thereon, the display unit comprising a plurality of light emitting diodes (LEDs), each one of the LEDs being adapted to selectively emit and detect light; and
   a controller configured for controlling the display unit, the controller being configured for:
   processing a given image being actually displayed on the display unit according to selection rules to identify at least a first one of the plurality of LEDs to be operated as a light detector;
   concurrently operating the at least a first one of the plurality of LEDs as the light detector and at least a second one of the plurality of LEDs as a light emitter in order to concurrently detect light incident on the at least a first one of the plurality of LEDs and display the image of the eye on the display unit;
   determining a reaction as a function of the detected light; and
   outputting a command indicative of the determined reaction.

2. The artificial body of claim 1, further comprising at least one of a torso, at least one arm, at least one hand, at least one leg, and at least one foot.

3. A computer program product comprising a computer readable memory storing computer executable instructions thereon that when executed by a computer perform the method steps of:
   processing a given image being actually displayed on a display unit according to selection rules to identify at least a first one of a plurality of light emitting diodes (LEDs) of the display unit to be operated as a light detector;

concurrently operating the at least a first one of the plurality of LEDs as the light detector and at least a second one of the plurality of LEDs as a light emitter in order to concurrently detect light incident on the at least a first one of the plurality of LEDs and display an image of an eye on the display unit, the display unit being embedded into an artificial body;

determining a reaction as a function of the detected light; and outputting a command indicative of the determined reaction to control the artificial body.

4. A system for controlling an artificial body, the system comprising:

a display unit for displaying an image of an eye thereon, the display unit comprising a plurality of light emitting diodes (LEDs) each adapted to emit light, at least a given one of the LEDs being adapted to selectively emit light and detect light; and a controller configured for controlling the display unit, the controller being configured for:

processing a given image being actually displayed on the display unit according to selection rules to identify at least a first one of the plurality of LEDs to be operated as a light detector;

concurrently operating the at least a first one of the plurality of LEDs as the light detector and at least a second one of the plurality of LEDs as a light emitter in order to concurrently detect light incident on the at least a first one of the plurality of LEDs and display the image of the eye on the display unit;

determining a reaction as a function of the detected light; and outputting a command indicative of the determined reaction.

5. The system of claim 4, wherein the controller is adapted to determine the reaction as a function of a patient profile, the patient profile comprising at least one of an age, an eye color, a weight, a heart rate, an ethnicity and a medical condition.

6. The system of claim 4, wherein one of the selection of the at least a first one of the LEDs and a number of the least one first LED varies in time.

7. The system of claim 4, wherein the controller is adapted to determine the reaction as a function of one of an intensity of the detected light and an intensity variation of the detected light.

8. The system of claim 7, wherein the intensity comprises one of a peak intensity, a total intensity, an average intensity, and a pattern of detected light indicating a measured intensity and a position within the display unit for each one of the at least one first LED, and the intensity variation comprises one of a peak intensity variation, a total intensity variation, an average intensity variation and a variation of the pattern of detected light.

9. The system of claim 4, wherein the artificial body comprises an articulated body part and the determined reaction comprises a movement for the articulated body part.

10. The system of claim 9, wherein the controller is adapted to determine at least one of a type of movement and a movement amplitude.

11. The system of claim 4, wherein the reaction comprises a sound to be emitted.

12. A method for controlling an artificial body using a display unit, the display unit comprising a plurality of light emitting diodes (LEDs), each ones of the LEDs being adapted to selectively emit and detect light, the method comprising:

processing a given image being actually displayed on the display unit according to selection rules to identify at least a first one of the plurality of LEDs to be operated as a light detector;

concurrently operating the at least a first one of the plurality of LEDs as the light detector and at least a second one of the plurality of LEDs as a light emitter, thereby concurrently detecting light incident on the at least a first one of the plurality of LEDs and displaying an image of an eye;

determining a reaction as a function of the detected light; and outputting a command indicative of the determined reaction.

13. The method of claim 12, wherein said determining the reaction is further performed as a function of a patient profile, the patient profile comprising at least one of an age, an eye color, a weight, a heart rate, an ethnicity and a medical condition.

14. The method of claim 12, wherein one of said selecting the at least a first one of the LEDs and a number of the least one first LED varies in time.

15. The method of claim 12, wherein said determining the reaction is performed as a function of one of an intensity of the detected light and an intensity variation of the detected light.

16. The method of claim 15, wherein the intensity comprises one of a peak intensity, a total intensity, an average intensity and a pattern of detected light indicating a measured intensity and a position within the display unit for each one of the at least one first LED, and the intensity variation comprises one of a peak intensity variation, a total intensity variation, an average intensity variation and a variation of the pattern of detected light.

17. The method of claim 12, wherein the artificial body comprises an articulated body part and said determining the reaction comprises determining a movement for the articulated body part.

18. The method of claim 17, wherein said determining the movement comprises determining at least one of a type of movement and a movement amplitude.

19. The method of claim 12, wherein said determining the reaction comprises determining a sound to be emitted.

* * * * *